United States Patent
Maier et al.

(10) Patent No.: US 8,042,437 B2
(45) Date of Patent: Oct. 25, 2011

(54) TOOL STRUCTURE

(75) Inventors: Johann Maier, Pflach (AT); Siegfried F. Kerle, Rieden (AT); Eduard Reich, Holzgau (AT); Einar Schurda, Ehrwald (AT)

(73) Assignee: Ceratizit Austria Gesellschaft m.b.H, Reutte/Tirol (AT)

( * ) Notice: Subject to any disclaimer, the term of this patent is extended or adjusted under 35 U.S.C. 154(b) by 875 days.

(21) Appl. No.: 11/867,765

(22) Filed: Oct. 5, 2007

(65) Prior Publication Data
US 2008/0247832 A1 Oct. 9, 2008

Related U.S. Application Data

(63) Continuation of application No. PCT/AT2006/000131, filed on Mar. 31, 2006.

(30) Foreign Application Priority Data

Apr. 5, 2005 (AT) .............................. GM203/2005 U

(51) Int. Cl.
*B23C 5/00* (2006.01)
(52) U.S. Cl. ............ 82/161; 82/158; 409/234; 408/226; 408/239 R
(58) Field of Classification Search .................... 82/158, 82/161; 408/233, 238, 239 R, 239 A; 409/232, 409/234; 279/83
See application file for complete search history.

(56) References Cited

U.S. PATENT DOCUMENTS

| | | | | |
|---|---|---|---|---|
| 1,311,961 A * | 8/1919 | Gairing | ............................ | 279/22 |
| 1,647,802 A * | 11/1927 | Josef | .............................. | 403/305 |
| 2,073,430 A * | 3/1937 | Tautz | ......................... | 144/250.18 |
| 2,362,053 A * | 11/1944 | Danielson | ...................... | 408/233 |
| 2,397,382 A * | 3/1946 | Smith | ............................. | 403/350 |
| 2,416,285 A * | 2/1947 | Buckingham et al. | ......... | 403/361 |
| 2,618,940 A * | 11/1952 | Wyzenbeek | ..................... | 464/52 |
| 2,844,947 A * | 7/1958 | Shipley | .............................. | 464/7 |

(Continued)

FOREIGN PATENT DOCUMENTS
DE 2713529 A1 9/1978
(Continued)

OTHER PUBLICATIONS

Austrian Search Report dated Dec. 16, 2005.
(Continued)

*Primary Examiner* — Boyer D Ashley
*Assistant Examiner* — Sara Addisu
(74) *Attorney, Agent, or Firm* — Laurence A. Greenberg; Werner H. Stemer; Ralph E. Locher

(57) ABSTRACT

A tool structure contains a first part having an oval end section with regard to an axis of symmetry in a direction of a maximum height and an axis of symmetry in the direction of a maximum width, and a second part having a recess accommodating the end section via mutual contact surfaces. The tool structure has a clamping element for the mutual clamping of the parts and mutual contact surfaces that are restricted to in each case four spaced-apart surface sections. These surface sections are disposed symmetrically with respect to a circumference of the end section such that a center point of a straight connecting line of the starting and end points of the respective surface section is at a normal distance $b_1$ from the axis of symmetry and at a normal distance $h_1$ from the axis of symmetry, $h_1$ being greater than $b_1$.

13 Claims, 4 Drawing Sheets

U.S. PATENT DOCUMENTS

| | | | | |
|---|---|---|---|---|
| 3,023,015 | A * | 2/1962 | Pankow | 279/14 |
| 3,094,338 | A * | 6/1963 | Page | 279/23.1 |
| 3,114,537 | A * | 12/1963 | Krekeler | 299/109 |
| 3,320,833 | A * | 5/1967 | Andreasson | 408/57 |
| 4,073,160 | A * | 2/1978 | Perret | 464/158 |
| 4,705,435 | A * | 11/1987 | Christoffel | 408/59 |
| 5,026,224 | A * | 6/1991 | Andersson et al. | 409/234 |
| 5,163,790 | A | 11/1992 | Vig | |
| 5,261,302 | A * | 11/1993 | Erickson et al. | 82/160 |
| 5,551,811 | A * | 9/1996 | Satran et al. | 407/40 |
| 6,619,897 | B2 * | 9/2003 | Erickson et al. | 409/234 |
| 6,863,478 | B2 * | 3/2005 | Steiger et al. | 408/226 |
| 6,896,450 | B2 * | 5/2005 | Rothenstein | 408/59 |
| 6,974,287 | B2 * | 12/2005 | Neumeier | 409/232 |
| 7,112,020 | B2 * | 9/2006 | Sheffler et al. | 409/234 |
| 7,153,071 | B2 * | 12/2006 | Blomberg et al. | 408/226 |
| 7,156,006 | B2 * | 1/2007 | Hyatt et al. | 82/1.11 |
| 7,240,593 | B2 * | 7/2007 | Little | 82/1.11 |
| 7,325,471 | B2 * | 2/2008 | Massa et al. | 82/1.11 |
| 7,520,698 | B2 * | 4/2009 | Hackman | 407/29 |
| 2006/0048615 | A1 * | 3/2006 | Treige | 82/158 |

FOREIGN PATENT DOCUMENTS

| | | |
|---|---|---|
| EP | 0294348 A1 | 12/1988 |
| EP | 0385280 B1 | 1/1995 |
| EP | 1243365 A2 | 9/2002 |
| GB | 2228695 A | 9/1990 |
| WO | 9407637 | 4/1994 |
| WO | 9419132 | 9/1994 |
| WO | 9535179 | 12/1995 |

OTHER PUBLICATIONS

International Search Report dated Apr. 23, 2007.

* cited by examiner

TOOL STRUCTURE

CROSS-REFERENCE TO RELATED APPLICATION

This is a continuation, under 35 U.S.C. §120, of copending international application No. PCT/AT2006/000131, filed Mar. 31, 2006, which designated the United States; this application also claims the priority, under 35 U.S.C. §119, of Austrian patent application No. GM 203/2005, filed Apr. 5, 2005; the prior applications are herewith incorporated by reference in their entirety.

BACKGROUND OF THE INVENTION

Field of the Invention

The invention relates to a tool structure having a longitudinal axis. The tool structure contains a first part having an end section which in cross section is configured to be symmetrical perpendicularly to the longitudinal axis and generally oval with an axis of symmetry in the direction of a maximum height and an axis of symmetry in the direction of a maximum width, the height being greater than the width. The tool structure further has a second part having a recess which is provided for accommodating the end section via mutual contact surfaces, and at least one clamping element for the mutual clamping of the first and second parts.

Such tool structures are often used in particular during the machining of metals and are known in a large number of different embodiments. Thus a working head carrying a cutting insert is often connected to a tool receptacle, thereby enabling many different tool heads to be used on one and the same tool receptacle and thus providing modular tool systems.

Tool structures of this type are described, for example, in International patent disclosure WO 94/07637 or in published, European patent application EP 0 636 055 A1, corresponding to U.S. Pat. No. 5,551,811. A common feature of both embodiments of these tool structures is that the outer contour of the individual tool parts is generally circular, as a result of which, in particular in the case of tools for internal machining, the space available for the machining in the direction of the main cutting forces which occur is not used in an optimum manner. As a result, the stability of the tools suffers to a considerable degree. A further disadvantage of the tools according to WO 94/07637 is the mechanism for the reliable releasable clamping of the individual tool parts, this mechanism being of a complicated configuration.

A further configuration, often appearing in practice, of divisible cutting tools is known in the case of boring bars, where the end section of the boring bar is inserted into a suitable boring bar receptacle and clamped there. In most known embodiments of this type, the boring bar shank is of a circular configuration with a correspondingly configured recess of the boring bar receptacle. It is important in this case that the boring bar shank is fixed in a precisely established radial position in the boring bar receptacle in order to optimally position the cutting edge at the other end of the boring bar.

In order to ensure this, the boring bar shank is as a rule flattened on the top side with a flat surface on which the ends of a plurality of clamping screws, positioned in the boring bar receptacle, act for fixing the boring bar. However, in order to push the boring bar shank into the boring bar receptacle, certain play must be present, as a result of which canting of the boring bar and thus incorrect positioning of the cutting edges may occur when the clamping screws are tightened. Furthermore, it is disadvantageous that the boring bar only comes to bear in that region of the boring bar receptacle that is opposite the clamping screws. In the other regions, play is provided between the boring bar and the boring bar receptacle, as a result of which vibrations may occur during the machining.

In order to achieve correct positioning of the boring bar in the boring bar receptacle, it has been proposed according to European patent EP 0 385 280 B1 to provide boring bars with a projection, protruding radially at the side from the circumference of the shank, on their end section for fixing in the boring bar receptacle. The recess of the boring bar is correspondingly adapted to this shape, as a result of which correct positioning of the boring bar in the boring bar receptacle is achieved. The rest of the boring bar outside the end section is again of a generally circular configuration, as a result of which the disadvantage described at the beginning with regard to the available space not optimally utilized during the internal machining of bores is still present.

Published, non-prosecuted German patent application DE 27 13 529 A1 describes a boring bar whose shank section, at least in the region which is located in the bore for the internal machining, is provided with an approximately elliptical cross section. Therefore the boring bar, during the machining in of bores, both uses the space in an optimum manner and has excellent stability. To clamp the boring bar in a suitable boring bar receptacle, however, it is proposed that the end provided for the clamping either be of one-piece circular or square configuration or be provided with a correspondingly shaped clamping sleeve which is pushed over the elliptical shank in order to again obtain the desired circular or square cross section for inserting into the boring bar receptacle. The idea of providing the elliptical cross section directly for accommodating in the boring bar receptacle cannot be deduced from this prior publication.

European patent EP 0 294 348 B1 describes a tool structure in which the individual tool components are connected to one another, inter alia, via a projection of an oval shape which engages in a correspondingly shaped recessed portion. The projection and the recessed portion are in this case configured to taper conically in the longitudinal axis of the tool structure. In addition, the projection and the recessed portion are of a flexible configuration. When the individual tool parts are clamped against one another by displacing the tool parts in the direction of the longitudinal axis relative to one another, the mutual contact of the individual tool parts is affected over the entire circumference of projection and recessed portion. The disadvantage in this case is that such contact surfaces have to be extremely accurate and involve a high production cost.

BRIEF SUMMARY OF THE INVENTION

It is accordingly an object of the invention to provide a tool structure which overcomes the above-mentioned disadvantages of the prior art devices of this general type, which offers advantages in the use of space during internal machining and which permits a simple-to-produce, true-to-size and stable connection of the individual tool components.

With the foregoing and other objects in view there is provided, in accordance with the invention, a tool structure. The tool structure contains a longitudinal axis and a first part having an end section with a cross section being symmetrical perpendicularly to the longitudinal axis and generally oval with respect to a first axis of symmetry in a direction of a maximum height and a second axis of symmetry in a direction of a maximum width, the maximum height being greater than the maximum width. The tool structure has a second part with a recess for accommodating the end section via mutual contact surfaces of the first and second parts. At least one clamping element is provided for mutually clamping the first and second parts. The mutual contact surfaces, with or without an inclusion of a contact surface of the clamping element, are restricted, as viewed in cross section, to in each case four spaced-apart surface sections running approximately in a direction of the longitudinal axis and disposed symmetrically with respect to a circumference of the end section such that a center point of a straight connecting line of starting and end points of a respective surface section is at a normal distance $b_1$ from the first axis of symmetry and at a normal distance $h_1$ from the second axis of symmetry, the normal distance $h_1$ being greater than the normal distance $b_1$.

According to the invention, this is achieved in that the mutual contact surfaces, with or without the inclusion of the contact surface of a clamping element, are restricted, as viewed in cross section, to in each case four spaced-apart surface sections which run approximately in the direction of the longitudinal axis and which are disposed symmetrically with respect to the circumference of the end section in such a way that the center point of the straight connecting line of the starting and end points of the respective surface section is at a normal distance $b_1$ from the axis of symmetry in the direction of the maximum height h and at a normal distance $h_1$ from the axis of symmetry in the direction of the maximum width b, $h_1$ being greater than $b_1$. The oval cross-sectional shape having the four contact surfaces, disposed symmetrically at the circumference, on the tool part having the end section enables simple radial positioning, free of play, in the tool part having the recess. At the same time, the oval cross-sectional shape can also be transferred to the outer contours of the sections of the tool part having the end section, which during internal machining lies inside the bore to be machined. As a result, the maximum space available in the bore for the tool is used in an optimum manner. Compared with round outer contours, depending on the configuration of the tool, an overall tool height that is greater by about 10 to 50 percent can thus be achieved in practice in the direction of the maximum cutting forces that occur, as a result of which the stability of the connection and of the tool is noticeably improved overall. For the most common tools, the gain in overall height that can be achieved will be about 25 percent. It is especially important that the individual mutual contact surfaces along the circumference of the end section and the recess, although disposed symmetrically with regard to the individual axes of symmetry, are each arranged at a different distance from the two axes of symmetry. This results in an optimum distribution of force over the individual contact surfaces during the mutual clamping of the tool parts by suitable clamping elements.

The tool structure according to the invention can be used for a large number of different tool components. Thus, in particular, a cuffing tool can be connected to a tool receptacle or to the machine spindle via the tool structure directly or also via an intermediate piece or an adapter.

It is especially advantageous if the oval outer contour of the end section of the tool part to be connected is formed by two arcs of a circle, the center points of which on the axis of symmetry in the direction of the maximum width b are at the same distance on both sides from the intersection with the axis of symmetry in the direction of the maximum height h. Such a configuration makes possible especially simple production of the oval outer contour.

It is also advantageous if the individual contact surfaces of the tool parts to be connected are each configured as a flat surface running in the direction of the longitudinal axis of the tool parts, and these surfaces can then be produced especially easily. In this way, a highly precise fit of the two tool parts is achieved.

In the tool part having the recess for accommodating the tool part having the oval end section, it is merely necessary for these four contact surfaces to be adapted exactly to the four contact surfaces on the outer contour of the end section. In the configuration of the remaining surfaces, it is advantageous if the contact surfaces are adapted to the corresponding outer contour of the end section with slight play in order to ensure the maximum strength of the receptacle.

If the tool structure according to the invention is used for connecting tool parts in which the end section is stepped with reduced external dimensions relative to the rest of the tool section, as is the case in modular tool systems for example, it is advantageous if, at the tool part having the end section, the region outside the end section and, at the tool part having the recess, the outer contour of this part is also largely adapted to the outer contour of the end section.

In this way, optimum use of the available space during internal machining is achieved for the tool even in modular tool systems.

It is ideal if the tool structure according to the invention is used when connecting a boring bar to the corresponding boring bar receptacle, the oval cross section then being selected in such a way that the axis of symmetry in the direction of the maximum height h is disposed approximately perpendicularly to the tool reference plane $P_r$ through in each case identical selected cuffing-edge points perpendicularly to the assumed cutting direction in accordance with DIN 6581. As a result, optimum conditions, combined with easy precise, mutual displaceability of the two tool parts, are achieved in a tool that is especially susceptible with regard to stability during the cuffing.

If the tool structure according to the invention is provided between the boring bar and the boring bar receptacle, it is advantageous to achieve the mutual clamping of the tool parts by the boring bar receptacle being configured to be elastic by means of a slot, opening into the recess, in the center between two contact surfaces, wherein the elastically connected sections can be pressed together by a clamping screw.

A further advantageous possibility of clamping together the boring bar and the boring bar receptacle is the use of a clamping part which is adjustable in the boring bar receptacle and which is restrained against one of the contact surfaces on the edge section via a clamping screw.

If the tool structure according to the invention is used in rotating or modular tool systems, it is advantageous to configure the end section and the recess to taper conically in the longitudinal axis and to clamp the tool parts by mutual change in position of the end section and the recess in the direction of the longitudinal axis of the tool parts. In such a connection of the tool parts, it is advantageous if the tool part having the end section and the tool part having the recess additionally have mutual plane-parallel bearing surfaces, which further increase the stability of the connection.

The mutual change in position of the end section and the recess in the direction of the longitudinal axis of the tool parts can be achieved in a simple manner by an axially disposed clamping screw having two thread sections with different pitch. But automatic possibilities, such as hydraulically or mechanically adjustable clamping bars or also other clamping systems, are likewise conceivable.

Other features which are considered as characteristic for the invention are set forth in the appended claims.

Although the invention is illustrated and described herein as embodied in a tool structure, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF A PREFERRED EMBODIMENT OF THE INVENTION

Figure 1:
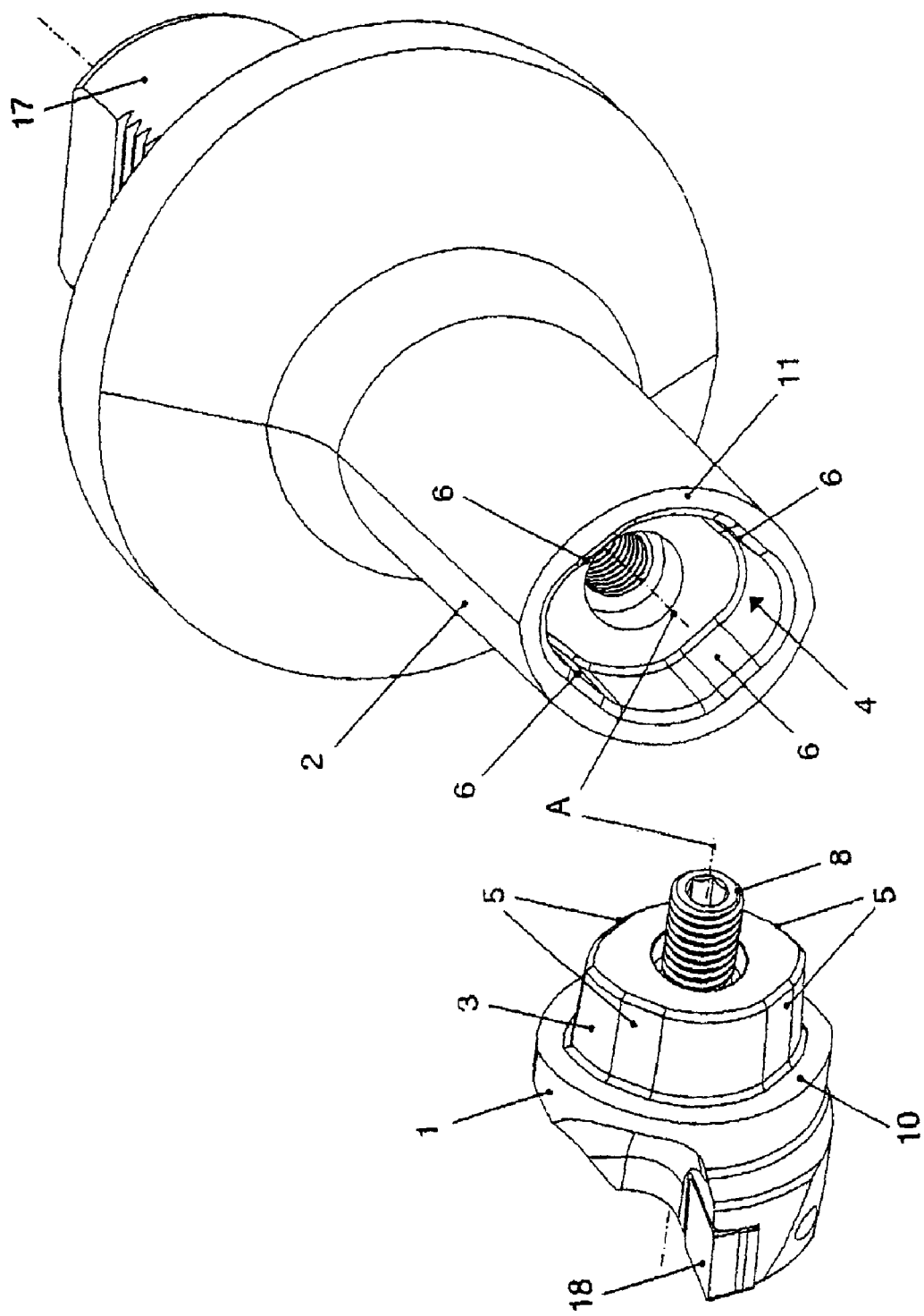
FIG. 1 is a diagrammatic, perspective view of a tool structure according to the invention in a separated state.
Figure 3:
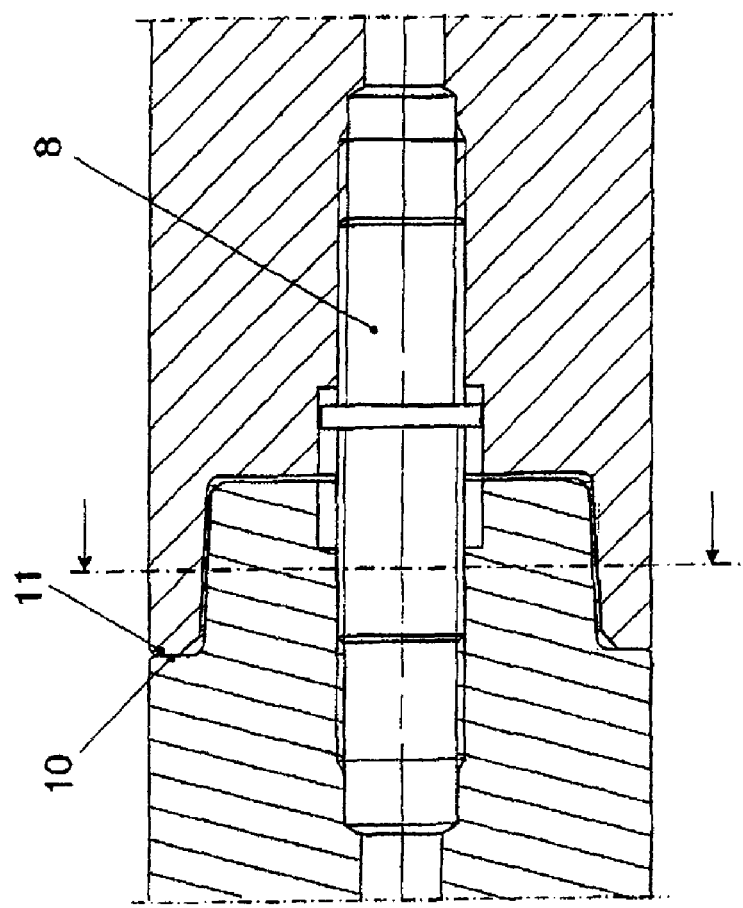
FIG. 3 is a longitudinal sectional view of the tool structure according to the invention according to FIG. 1 in the connected state.
Figure 2:
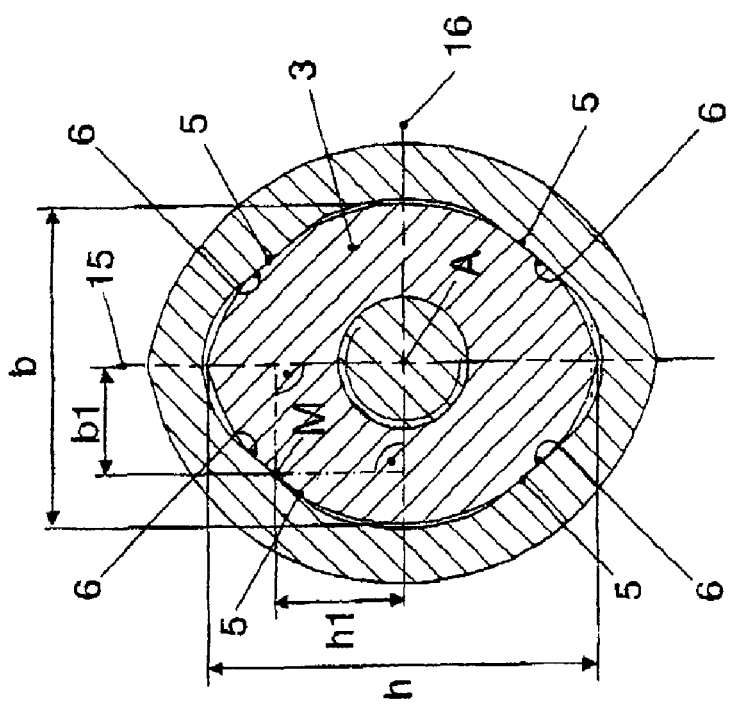
FIG. 2 is a cross-sectional view of the tool structure according to the invention according to FIG. 1 in a connected state.

Referring now to the figures of the drawing in detail and first, particularly, to FIGS. 1-3 thereof, there is shown a tool structure according to the invention in the form of a divisible lathe tool containing a tool head 1 with an interchangeable indexable insert 18 and a tool head receptacle 2 for accommodating the tool head 1. The tool head 1 has an end section 3 with a generally oval cross section that is symmetrical perpendicularly to a tool longitudinal axis A and tapers slightly conically in the direction of the longitudinal axis A of the tool. The end section 3 has an axis 15 (FIG. 2) of symmetry in the direction of a maximum height h of the cross section and, perpendicularly thereto, an axis 16 of symmetry in the direction of the maximum width b of the cross section. Furthermore, the end section 3 has at the circumference four symmetrically disposed, spaced-apart flat contact surfaces 5 which run approximately in the direction of the longitudinal axis A of the tool. The contact surfaces 5 are in this case arranged in such a way that they each have, as viewed in cross section, a normal distance $b_1$ from the axis 15 of symmetry and a normal distance $h_1$ from the axis 16 of symmetry, the distance $h_1$ being greater than the distance $b_1$. In this case, these distances are established independently of whether the contact surfaces 5 run in a flat or curved manner from a center point M of the straight connecting line which connects the starting and end points of the respective contact surface 5. Outside the end section 3, the tool head 1 has an outer contour that is adapted as an enlarged concentric curved shape approximately to the outer contour of the end section 3. As a result, a step having a surface 10 is formed which serves for the plane-parallel contact with a corresponding mating surface 11 of the tool head receptacle 2. The tool head receptacle 2 is configured at one end with a recess 4 for accommodating the end section 3 of the tool head 1 and at the other end with an end section 17 for fastening in a tool receptacle. The recess 4 has four contact surfaces 6 which are arranged symmetrically at the circumference and which, when the tool is assembled, are in engagement with the contact surfaces 5 of the end section 3 of the tool head 1. Outside these contact surfaces 6, the shape of the recess 4 is adapted with slight play approximately to the outer contour of the end section 3. The outer contour of the tool head receptacle 2 in the region of the recess 4 and in a further adjoining section is adapted to the outer contour of the front region of the tool head 1, thereby forming an end face 11 which serves for the plane-parallel bearing against the mating surface 10 of the tool head 1. By use of a clamping screw 8 which has two thread sections with different pitch, the tool head 1 and the tool head receptacle 2 are clamped together until plane-parallel bearing of the surfaces 10 and 11 is effected.

Figure 4:
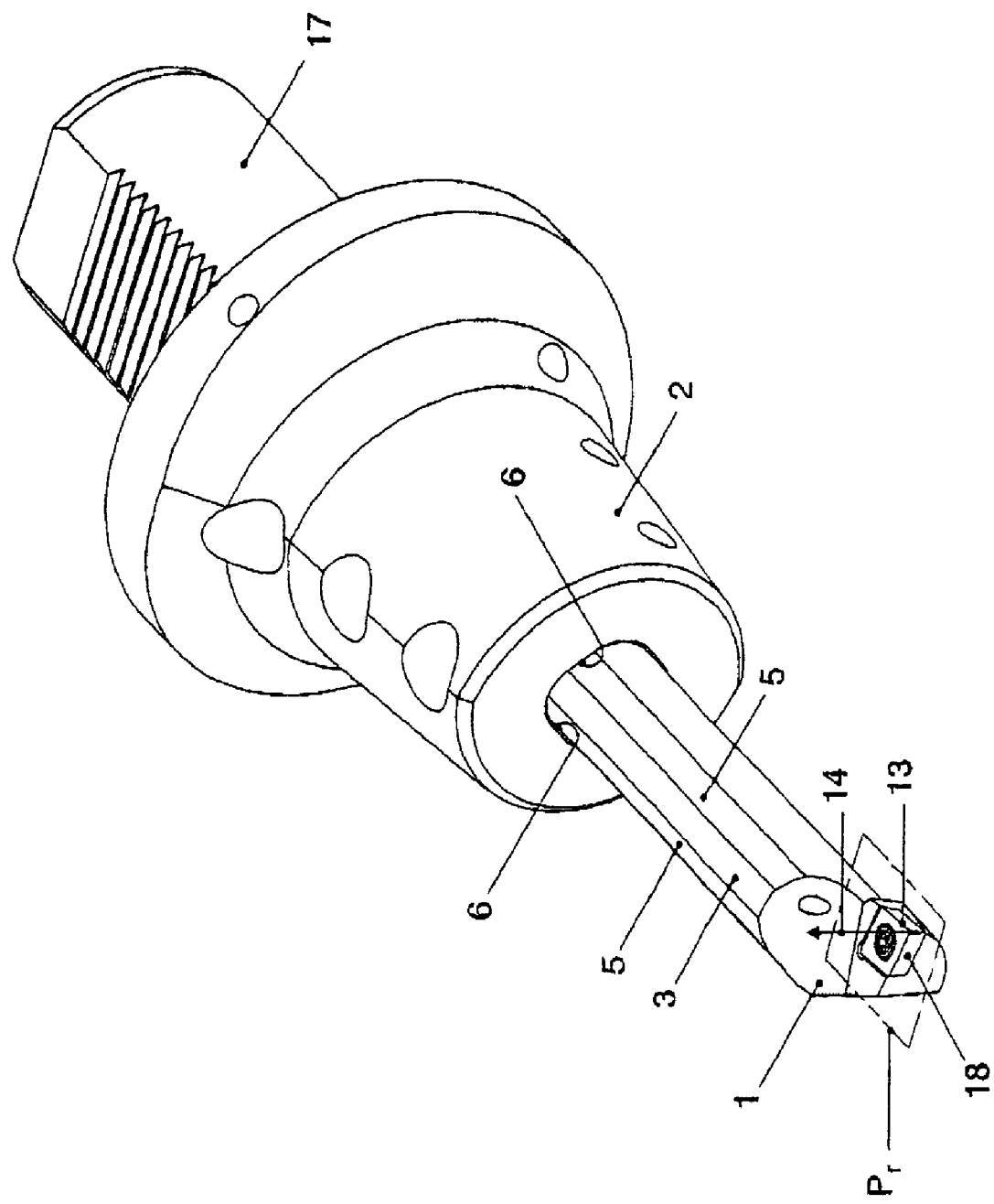
FIG. 4 is a diagrammatic, perspective view of a variant of the tool structure according to the invention.
Figure 6:
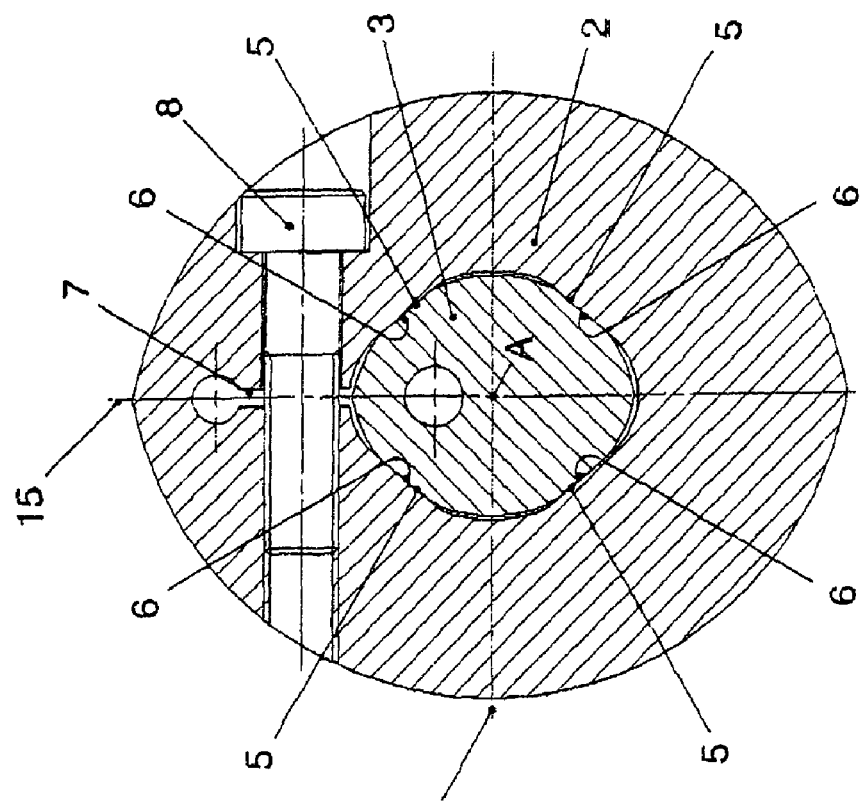
FIG. 6 is a diagrammatic, cross-sectional view of a further variant of the tool structure according to the invention similar to that in FIG. 4.
Figure 5:
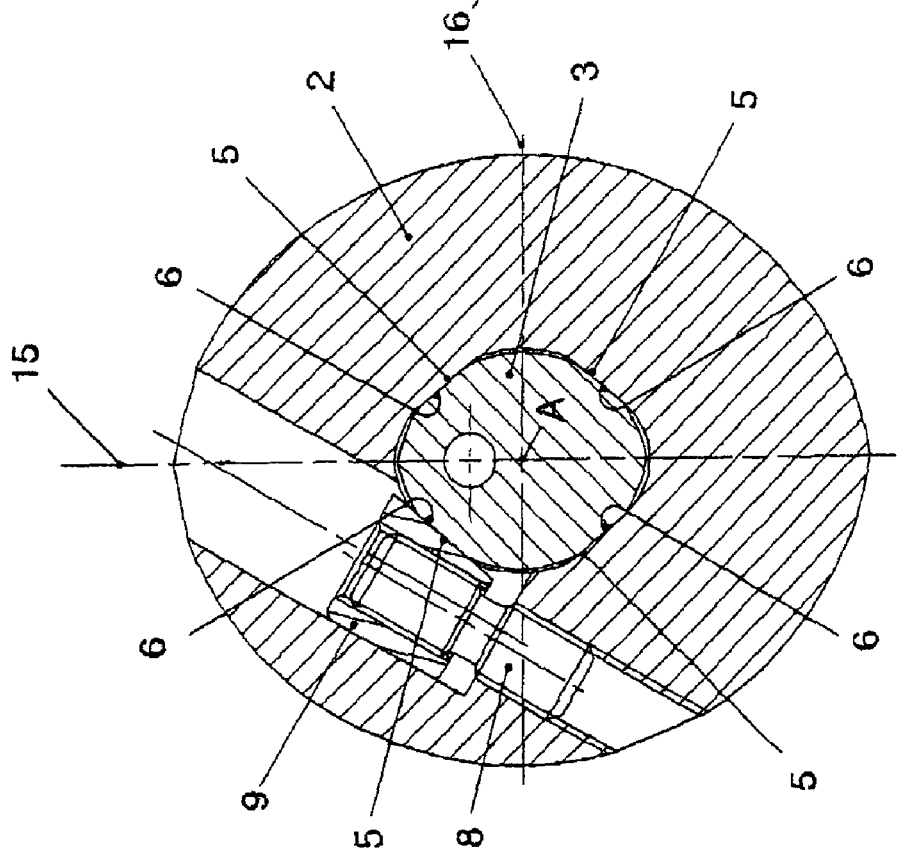
FIG. 5 is a cross-sectional view of the tool structure according to the invention according to FIG. 4.

FIGS. 4 to 6 show a tool structure according to the invention in the form of a boring bar 1 and a boring bar receptacle 2. In this case, the boring bar 1 has, over its entire length, with the exception of the head carrying the indexable insert 18, a symmetrical, generally oval uniform cross section having the contact surfaces 5 arranged according to the invention. The axis 15 of symmetry in the direction of the maximum height h of the boring bar 1 is in this case disposed perpendicularly to a tool reference plane $P_r$ through in each case identical, selected cutting-edge points 13 of the indexable insert 18 perpendicular to the assumed cutting direction 14 in accordance with DIN 6581. In this way, with optimum use of space, improved stability of the boring bar 1 is achieved. The boring bar receptacle 2 has a correspondingly adapted recess 4 with contact surfaces 6. The boring bar 1 can be displaced in the boring bar receptacle 2 within a wide range and can be clamped in the desired position. The reliable clamping of the two parts against one another is in this case achieved by the contact surface 6 of a clamping wedge 9, which is pulled against the contact surface 5 of the boring bar 1 by a clamping screw 8, a feature which is shown in FIG. 5.

A variant for a measure of fixing the boring bar 1 in the boring bar receptacle 2 is shown in FIG. 6. In this embodiment, the boring bar receptacle 4 is configured to be elastic with slight play relative to the end section 3 of the boring bar 1 by the formation of a slot 7 between two contact surfaces 6. The reliable clamping of the boring bar 1 and the boring bar receptacle 2 is effected by the sections that are elastically connected by the slot 7 being pressed together by the clamping screw 8.

The invention claimed is:

1. A tool structure, comprising:
   a longitudinal axis;
   a first part having an end section with a cross section being symmetrical perpendicularly to said longitudinal axis and generally oval with respect to a first axis of symmetry in a direction of a maximum height and a second axis of symmetry in a direction of a maximum width, said maximum height being greater than said maximum width;
   a second part having a recess formed therein for accommodating said end section via mutual contact surfaces of said first and second parts; and
   at least one clamping element mutually clamping said first and second parts
   said mutual contact surfaces, with or without an inclusion of a contact surface of said clamping element, are restricted, as viewed in cross section, to in each case four spaced-apart surface sections running approximately in a direction of said longitudinal axis and disposed symmetrically with respect to a circumference of said end section such that a center point of a straight connecting line of starting and end points of a respective surface section is at a normal distance $b_1$ from said first axis of symmetry and at a normal distance $h_1$ from said second axis of symmetry, said normal distance $h_1$ being greater than said normal distance $b_1$.

2. The tool structure according to claim 1, wherein said end section has an outer contour, as viewed in cross section, formed by two arcs of a circle, said center points of said two arcs lying on said second axis of symmetry are at a same distance on both sides from an intersection with said first axis of symmetry.

3. The tool structure according to claim 1, wherein said mutual contact surfaces are each flat surfaces.

4. The tool structure according to claim 1, wherein:
said end section has an outer contour; and
said recess, outside said mutual contact surfaces, is adapted with play to said outer contour of said end section.

5. The tool structure according to claim 1, wherein:
said first part has a region outside of said end section;
said end section has an outer contour; and
said second part has an outer contour and that said region outside of said end section and the outer contour of said second part are adapted approximately to said outer contour of said end section.

6. The tool structure according to claim 1, wherein said first part is a boring bar and said second part a boring bar receptacle, said first axis of symmetry is disposed approximately perpendicularly to a tool reference plane $P_r$ through in each case identical selected cutting-edge points perpendicularly to an assumed cutting direction in accordance with DIN 6581.

7. The tool structure according to claim 6, wherein:
said clamping element has a clamping screw; and
said mutual clamping of said first and second parts is achieved by said boring bar receptacle having a slot formed therein in a center between two of said mutual contact surfaces and opening into said recess, said slot providing said boring bar receptacle with elasticity and defining elastically connected sections, said elastically connected sections can be pressed together by said clamping screw.

8. The tool structure according to claim 6, wherein:
said clamping element has a clamping edge and a clamping screw; and
said mutual clamping of said first and second parts is achieved by said clamping wedge which is adjustable in said boring bar receptacle and which is restrained against one of said mutual contact surfaces on said end section via said clamping screw.

9. The tool structure according to claim 6, wherein said end section and said recess taper conically in said longitudinal axis, and said mutual clamping of said first and second parts is effected by mutual change in position of said end section and said recess in the direction of the longitudinal axis.

10. The tool structure according to claim 9, wherein said first part and said second part further have mutual plane-parallel bearing surfaces.

11. The tool structure according to claim 9, wherein:
said clamping screw is an axial clamping screw having two thread sections with different pitch; and
said mutual change in position of said end section and said recess is achieved via said axial clamping screw.

12. A tool component of a tool structure having a longitudinal axis, the tool component selected from the group consisting of a tool for machining, an adapter for a tool, and a receptacle for a tool, the tool component comprising:
an end section having a cross section being symmetrical perpendicularly to the longitudinal axis and generally oval with respect to a first axis of symmetry in a direction of a maximum height and a second axis of symmetry in a direction of a maximum width, said maximum height being greater than said maximum width, said end section, as viewed in said cross section, has four spaced-apart surface sections, functioning as contact surfaces, running approximately in the direction of the longitudinal axis and being disposed symmetrically with respect to a circumference of said end section such that a center point of a straight connecting line of starting and end points of a respective surface section is at a normal distance $b_1$ from said first axis of symmetry and at a normal distance $h_1$ from said second axis of symmetry, said normal distance $h_1$ being greater than said normal distance $b_1$.

13. A tool component of a tool structure having a longitudinal axis, the tool component selected from the group consisting of a tool for machining, an adapter for a tool, and a receptacle for a tool, the tool component comprising:
a part having a recess formed therein, said recess having a cross section being symmetrical perpendicularly to the longitudinal axis and generally oval with respect to a first axis of symmetry in a direction of a maximum height and a second axis of symmetry in a direction of a maximum width, said maximum height being greater than said maximum width, said recess, as viewed in said cross section, has four spaced-apart surface sections, functioning as contact surfaces, running approximately in a direction of the longitudinal axis and are disposed symmetrically with respect to a circumference of said recess such that a center point of a straight connecting line of starting and end points of a respective surface section is at a normal distance $b_1$ from said first axis of symmetry and at a normal distance $h_1$ from said second axis of symmetry, said normal distance $h_1$ being greater than said normal distance $b_1$.

* * * * *